United States Patent [19]

Inui et al.

[11] Patent Number: 5,573,582
[45] Date of Patent: Nov. 12, 1996

[54] PROCESS FOR PREPARING FINE-PARTICULATE METAL HYDROXIDE COMPRISING ALUMINUM HYDROXIDE AND METAL OXIDE COMPRISING ALUMINUM OXIDE

[75] Inventors: Masamichi Inui; Yoshiaki Takeuchi; Yasushi Teshima; Koji Yamamoto; Makio Kimura; Takahiro Ishida, all of Niihama, Japan

[73] Assignee: Sumitomo Chemical Co., Ltd., Osaka, Japan

[21] Appl. No.: 493,456

[22] Filed: Jun. 23, 1995

[30] Foreign Application Priority Data

| Jun. 24, 1994 | [JP] | Japan | 6-143678 |
| Jun. 24, 1994 | [JP] | Japan | 6-143682 |
| Jun. 24, 1994 | [JP] | Japan | 6-143683 |

[51] Int. Cl.$^6$ ............... C01F 7/00; C04B 35/10
[52] U.S. Cl. ............... 106/287.17; 106/286.2; 423/21.1; 423/71; 423/118.1; 423/119; 423/115
[58] Field of Search ............. 106/287.17, 286.2; 423/21.1, 71, 118.1, 119, 115

[56] References Cited

U.S. PATENT DOCUMENTS

| 3,786,137 | 1/1974 | Thomas . | |
| 4,275,052 | 6/1981 | Ryu . | |
| 4,732,742 | 3/1988 | Puig | 423/119 |
| 5,152,974 | 10/1992 | Legrand et al. | 423/71 |

FOREIGN PATENT DOCUMENTS

| 62-158116 | 7/1987 | Japan . |
| 5229813 | 9/1993 | Japan . |
| 2168334 | 6/1986 | United Kingdom . |

OTHER PUBLICATIONS

"Alumina Sol . . . Alkoxides", Ceramic Bulletin, vol. 54, No. 3 (1975 no month avail., pp. 289–90; B. E. Yoldas.
CA 124:150024 "Continuous process for the manufacture . . .", Inui et al. Apr. 1, 1996.
"Preparation of . . . Alkoxides", Journal of American Ceramics society, vol. 74, No. 9, (1991) no month avail., pp. 2263–2269, Takashi Ogihara et al.
"Synthesis of . . . Alkoxides", Nippon Ceramics Kyokai Gakujutsu Ronbunshi, (May 31, 1991) vol. 99, No. 10, (1991), pp. 1036–1045, Gary L. Messing et al.
"Controlled Growth . . . Range", Journal Of Colloid And Interface Science, vol. 26, (1968) no month avail., pp. 62–69, Werner Stober et al.
"Formation, Packing, . . . Powders", Communications of the American Ceramic Society, (Dec. 1982), pp. C199–C201, Eric A. Barringer et al.

*Primary Examiner*—David Brunsman
*Attorney, Agent, or Firm*—Birch, Stewart, Kolasch & Birch, LLP.

[57] ABSTRACT

The present invention discloses a process for preparing a fine-particulate metal hydroxide comprising aluminum hydroxide as a major component which comprises continuously supplying water and a mixture of an aluminum alkoxide and at least one alkoxide of a metal selected from Mg, Ca, La, Fe, Si, Ti and Zr, to a high shear rate stirring area and a process for preparing a fine-particulate metal oxide comprising aluminum oxide as a major component which comprises drying and then calcining said metal hydroxide at 500°–1500° C.

16 Claims, 1 Drawing Sheet

PROCESS FOR PREPARING FINE-PARTICULATE METAL HYDROXIDE COMPRISING ALUMINUM HYDROXIDE AND METAL OXIDE COMPRISING ALUMINUM OXIDE

BACKGROUND OF THE INVENTION

1. Field of the Invention

The present invention relates to a process for preparing fine-particulate metal hydroxide comprising aluminum hydroxide as a major component and fine-particulate metal oxide comprising aluminum oxide as a major component. More precisely, it relates to a process for preparing fine-particulate metal hydroxide comprising aluminum hydroxide as a major component and fine-particulate metal oxide comprising aluminum oxide as a major component, having high industrial productivity and no tendency of producing coarse particles.

2. Description of the Related Art

Hydrolysis reaction of metal alkoxides has been the subject of growing interest as a method for preparing a sol, a gel and fine particles for precursors of ceramics in view the following advantages:
(1) the metal alkoxides are easily hydrolyzed at room temperature to produce metal hydroxides, and
(2) there is no possibility that the product is contaminated with anions as impurities, and a number of reports on said reaction have been published [see, for example, Amer., Ceram. Soc. Bull., 54, 286 (1975) and Nippon Ceramics Kyokai Gakujutsu Ronbunshi, 99 (10), 1036–1046 (1991)).

When a silicon alkoxide or a titanium alkoxide is used as the starting material, monodispersed spherical particles of uniform particle size containing no coarse particles can easily be obtained by hydrolysis (see, for example, J. Colloid Interface Sci., 26, 62 (1968) and J. Am. Ceram. Soc., 65, C199 (1982)). However, when an aluminum alkoxide is used as the starting material, colloidal gel or gel-form precipitate tends to be formed due to its higher hydrolysis reaction rate. Therefore, it has been considered that the production of monodispersed particles of uniform particle size without containing coarse particles is difficult.

Metal oxide comprising aluminum oxide as a major component, produced by calcining powdered metal hydroxide comprising aluminum hydroxide as a major component, is a material which has been widely used as a raw material for sintering and as various kinds of fillers. It is desirable to produce a metal oxide comprising aluminum oxide as a major component, which has a narrow particle size distribution and can be easily dispersed, in order to obtain excellent properties.

In the synthesis of aluminum hydroxide by hydrolysis of an aluminum alkoxide, several inventions and researches have been made to prepare monodispersed fine particles under certain specific conditions (JP-A-Sho 62-158116 and J. Am. Ceram. Soc., 74, 2263 (1991)).

Those approaches use the hydrolysis reaction at a low concentration of the raw material in a reaction medium to which a solvent other than the alcohol constituting the aluminum alkoxide is added. While the monodispersed particles containing no coarse particle may be produced by those processes, productivity is low in industrial production.. Further, the alcohol used as the solvent must be purified before it is recycled to the synthesis of aluminum alkoxide.

In addition, as aluminum oxide having a narrow particle size distribution, aluminum oxide produced by vapor phase hydrolysis in which anhydrous aluminum chloride is evaporated and combustively hydrolyzed in an oxyhydrogen flame, has been known.

The aluminum oxide produced by this method suffers from a drawback that, when used as various kinds of fillers, it is corrosive due to the presence of an inevitable chlorine component as an impurity.

Further, particulate aluminum oxide produced by pulverization, milling, grinding or the like of aluminum oxide containing coarse particles also suffers from a drawback that it has a broad particle size distribution and is susceptible to reagglomeration.

SUMMARY OF THE INVENTION

An object of the present invention is to provide a process for preparing fine-particulate metal hydroxide comprising aluminum hydroxide as a major component, having high industrial productivity and no tendency of producing coarse particles.

Another object of the present invention is to provide a process for preparing fine-particulate metal oxide comprising aluminum oxide as a major component, having high industrial productivity and no tendency of producing coarse particles.

After an extensive study on the processes for preparing fine-particulate metal hydroxide comprising aluminum hydroxide as a major component and metal oxide comprising aluminum oxide as a major component, the present inventors discovered the facts that the above object can be achieved by conducting hydrolysis of an aluminum alkoxide in the presence of a specific metal alkoxide under specific stirring conditions, and that the object can more effectively be accomplished by drying the produced metal hydroxide under specific conditions, which facts lead them to the present invention.

Accordingly, the present invention relates to a process for preparing fine-particulate metal hydroxide comprising aluminum hydroxide as a major component which comprises continuously supplying water and a mixture of an aluminum alkoxide and at least one alkoxide of a metal selected from Mg, Ca, La, Fe, Si, Ti and Zr, to a high shear rate stirring area; and a process for preparing fine-particulate metal oxide comprising aluminum oxide as a major component which comprises drying and then calcining said metal hydroxide at 500°–1500° C.

DETAILED DESCRIPTION OF THE INVENTION

Figure 1:
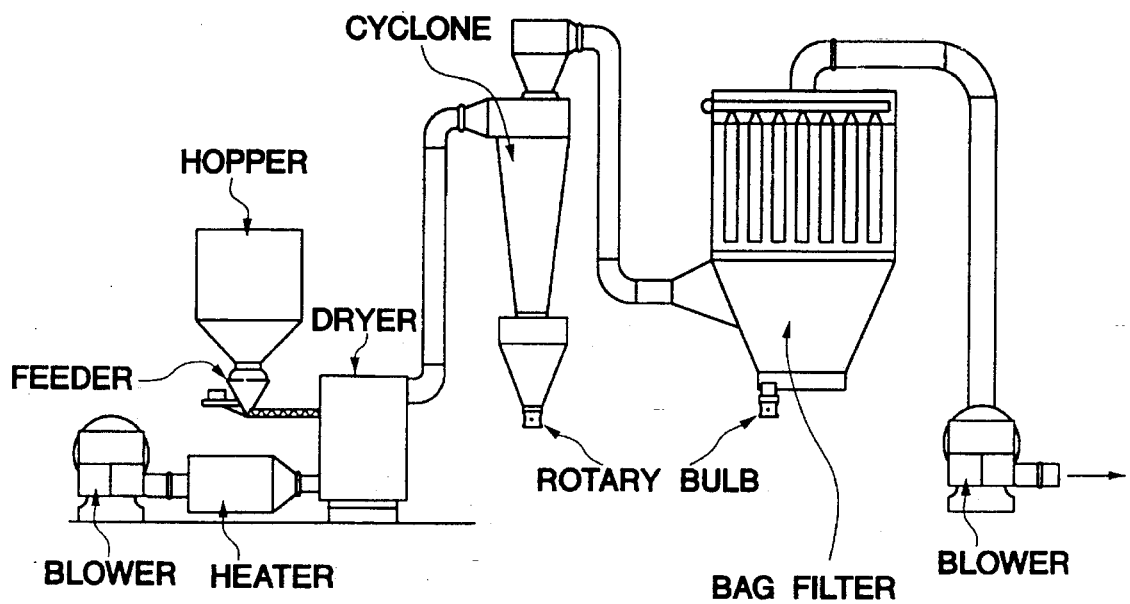
FIG. 1 schematically shows one embodiment of pneumatic conveying dryer (Flash Jet Dryer) in the present invention.
Figure 2:
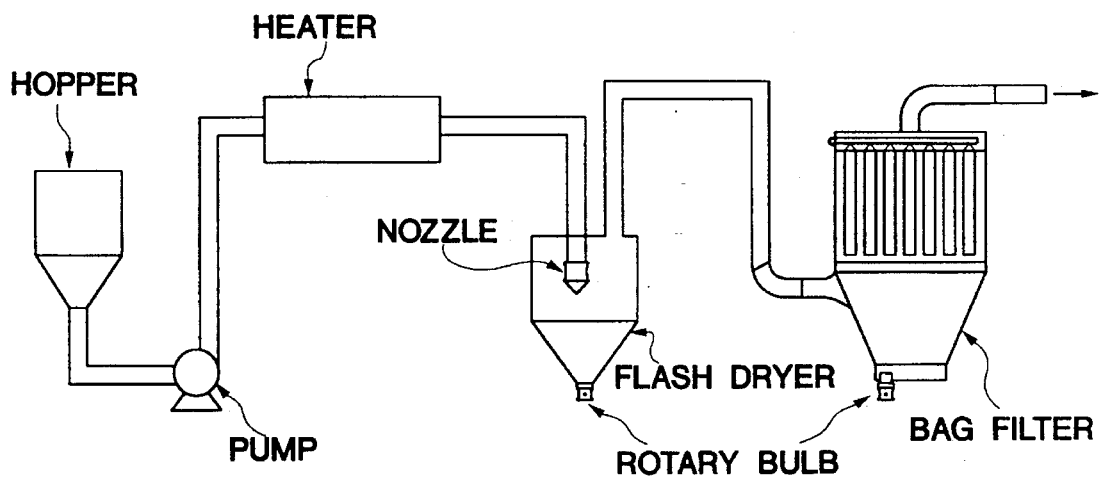
FIG. 2 schematically shows one embodiment of flash dryer in the present invention.

The present invention is explained in more detail in the following description.

Metal hydroxide in fine-particulate form comprising aluminum hydroxide as a major component can be obtained by continuously hydrolyzing by separately supplying water and a mixture of aluminum alkoxide and at least one alkoxide of a metal selected from Mg, Ca, La, Fe, Si, Ti and Zr into a high shear rate stirring area.

In the present invention, the fine-particulate metal hydroxide comprising aluminum hydroxide as a major component (in this specification, it is referred to as "said hydroxide") contains 0.1 to 15% by mole, preferably 1 to 10% by mole in total of a metal component selected from Mg, Ca, La, Fe, Si, Ti and Zr as compared to aluminum component [(total molar weight of Mg, Ca, La, Fe, Si, Ti and Zr)/(molar weight oral)]. It may also contain a compound having an alkoxy group or a chemically modified group derived from chemical modifiers described later in place of a part of hydroxy groups in aluminum hydroxide or in hydroxide of other metal, as long as it is formed in the precipitate of said hydroxide when the mixture of an aluminum alkoxide and at least one alkoxide of a metal selected from Mg, Ca, La, Fe, Si, Ti and Zr is hydrolyzed by mixing with water according to the present invention.

The aluminum alkoxides used in the present invention may be represented by the general formula:

$$Al(OR')_3$$

wherein R' is normal chain or branched alkyl group.

Examples of R' include an ethyl group, n-propyl group, isopropyl group, n-butyl group, sec-butyl group, t-butyl group and the like.

Examples of such alkoxides include those having usually 1 to 8 and preferably 2 to 4 carbon atoms, such as aluminum ethoxide, aluminum n-propoxide, aluminum isopropoxide, aluminum n-butoxide, aluminum sec-butoxide, aluminum t-butoxide and the like.

The alkoxide of a metal selected from Mg, Ca, La, Fe, Si, Ti and Zr (in this specification, it is referred to as "said other metal alkoxide") to be used in the present invention includes metal alkoxides represented by the general formulae:

$$Mg(OR)_2, Ca(OR)_2, La(OR)_3, Fe(OR)_2, Si(OR)_4, Ti(OR)_4, Zr(OR)_4$$

wherein R is alkyl, and/or derivatives of the metal alkoxides, so called chemically modified metal alkoxides, formed by substituting a part of the alkoxy group of the metal alkoxides with at least one chemical modifier (in this specification, it is referred to as "said chemical modifier") such as diketone, ketoester, diester, carboxylic acid, diol, ketoalcohol, aidehyde, amino acid, polyhydric alcohol acetate, amine, polyether and the like.

The molar amount of the metal alkoxide as compared to said chemical modifier in the preparation of said chemically modified metal alkoxide is more than 0.25 and preferably 1 to 30.

R includes normal chain or branched alkyl groups containing usually 1 to 8, preferably 2 to 4 carbon atoms, such as ethyl group, n-propyl group, isopropyl group, n-butyl group, sec-butyl group, t-butyl group and the like.

Specific examples of the chemical modifiers are diketones such as diacetyl, acetylbenzoyl, benzil, acetylacetone, benzoylacetone, dibenzoylmethane, trifluoroacetylacetone, hexafluoroacetylacetone, dipivaloylmethane, pivaloyltrifluoroacetone, and so on; ketoesters such as methyl acetoacetate, ethyl acetoacetate, and so on; diesters such as dimethyl malonate, diethyl malonate, dimethyl phthalate, diethyl phthalate, dibutyl phthalate, dioctyl phthalate, dioctyl adipate, diisodecyl adipate, dimethyl oxalate, diethyl oxalate, and so on; diols such as ethylene glycol, propylene glycol, trimethylene glycol, 1,3-butanediol, 1,4-butanediol, 1,5-pentanediol, 1,6-hexanediol, hexylene glycol, heptanediol, octanediol, nonanediol, decanediol, pinacol, diethylene glycol, and so on; ketoalcohols such as acetol, acetoin, acetoethylalcohol, diacetonealcohol, phenacylalcohol, benzoin, and so on; aldehydes such as salicylaldehyde, and so on; carboxylic acids such as formic acid, acetic acid, butyric acid, valetic acid, caproic acid, enanthic acid, caprylic acid, pelargonic acid, captic acid, undecylic acid, lauric acid, tridecylic acid, myristic acid, pentadecylic acid, palmitic acid, heptadecylic acid, stearic acid, oxalic acid, citric acid, fumaric acid, iminodibutyric acid, octylic acid, oleic acid, and so on; amino acids such as glycine; polyhydric alcohol acetates such as diethylene glycol monoethylether acetate, diethylene glycol monobutylether acetate, and so on; amines such as ethylenediamine, diethylenetriamine, triethylenetetramine, diethanolamine, triethanolamine, ethylenediamine tetraacetate, and so on; and polyethers such as diethylene glycol monomethyl ether, diethylene glycol dimethyl ether, diethylene glycol monoethyl ether, diethylene glycol diethyl ether, diethylene glycol dibutyl ether, triethylene glycol dimethylether, tetraethylene glycol dimethyl ether, ethylcellosolve, dodecanediol dimethyl ether, decanediol dimethyl ether, hexanediol dimethyl ether, hexanediol diethyl ether, diethylene glycol monobutyl ether, dipropylene glycol dimethyl ether, diethylene glycol butylmethyl ether, and so on.

Said other metal alkoxides may be used singly or as a mixture of at least two kinds.

Specific examples of said other metal alkoxides are magnesium diethoxide, magnesium diisopropoxide, calcium diethoxide, calcium diisopropoxide, tetraethoxy silane, tetraisopropoxy silane, tetra-n-butoxy silane, titanium tetramethoxide, titanium tetra-n-propoxide, titanium tetraethoxide, titanium tetraisopropoxide, titanium tetra-n-butoxide, zirconium tetraethoxide, zirconium tetra-n-propoxide, zirconium tetraisopropoxide, zirconium tetra-n-butoxide, triethoxy iron, triisopropoxy iron, triethoxy lanthanum, triisopropoxy lanthanum, magnesium dimethoxide, magnesium di-n-propoxide, tetrakis(2-ethylhethyloxy)titanium, tetrastearyloxy titanium, diisopropoxy bis (acetylacetonato) titanium, di-n-butoxy bis (triethanolaminato) titanium, dihydroxy bis(lactato)titanium, propanedioxy titanium (ethyl acetoacetate), propanedioxy titanium (acetylacetonate), titanium isopropoxyoctylene glycolate, titanium lactate, butyl titanate dimer, propanedioxy titanium (ethyl acetoacetate), calcium dipivalomethanate and so on.

The aluminum alkoxides and said other metal alkoxides are generally solid or viscous liquids at room temperature and it is preferred to use a mixture comprising an aluminum alkoxide and said other metal alkoxide (in this specification, it is referred to as "said mixture") in the form of a solution in a solvent for convenience in handling. The solvent is usually an alcohol. Specific examples of the alcohol include ethanol, n-propanol, isopropanol, n-butanol, sec-butanol, t-butanol and the like. It is preferred from the practical point of view to use the same alcohol as that produced by hydrolysis of alkoxy group of aluminum alkoxide or said other metal alkoxide, for example, isopropanol when aluminum isopropoxide and titanium isopropoxide are used, because fractional distillation or other purification may be eliminated or greatly reduced when recycling and reuse of the solvent are intended.

In order to form a derivative of said other metal alkoxide using said chemical modifier, any method can be applied as long as said other metal alkoxide can be chemically modified. It is preferred to mix a solution of said other metal alkoxide in the alcohol and said chemical modifier or a solution of said chemical modifier in the alcohol at a temperature between room temperature and the boiling temperature of the solvent and then the mixture is stirred for about an hour.

As aluminum alkoxide, a derivative of the aluminum alkoxide wherein a part of the alkoxy group of the aluminum alkoxide is substituted by at least one of said chemical modifiers, so called chemically modified aluminum alkoxide, may be used. The method of preparing such derivative may be conducted in the same manner as that of said other metal alkoxide.

The process for forming the mixture comprising the aluminum alkoxide and said other metal alkoxide is not particularly limited and may usually be carried out by combining a solution of aluminum alkoxide in an alcohol and said other metal alkoxide or a solution of said other metal alkoxide in an alcohol at a temperature between room temperature and the boiling temperature of the solvent. Alternatively, when an alkoxide of Mg is used as said other metal alkoxide, said mixture may be obtained by adding magnesium to a solution of aluminum alkoxide in an alcohol and refluxing to dissolve the magnesium.

The molar content of said other metal alkoxide to the aluminum alkoxide[(total molar weight of said other metal alkoxides)/(molar weight of aluminum alkoxide)] is usually 0.1 to 15%, preferably 1 to 10%. If the amount of said other metal alkoxide is too small, the micronizing effect for said hydroxide to be obtained is not sufficient.

The concentration of the aluminum alkoxide in the solution of said mixture is not particularly limited and it may depend on the solubility of respective compounds in the solvent. Usually, the concentration calculated in terms of aluminum alkoxide is about 30 to about 90% by weight. In this specification, the concentration calculated in terms of aluminum alkoxide means the concentration obtained by converting chemically modified aluminum alkoxide to unmodified aluminum alkoxide, in the case where the chemically modified aluminum alkoxide is used. When the concentration is too low, the concentration of said hydroxide in the resulting slurry is also low so that an excessive amount of alcohol must be distilled off in order to obtain said hydroxide from the slurry. When, on the contrary, the concentration is too high, some aluminum alkoxides having low solubility tend to precipitate, or reagglomeration may occur due to the too high concentration of said hydroxide in the resulting slurry during and/or after hydrolysis.

In the present invention, high shear rate stirring means stirring by mechanical energy such as shearing stress, pressure change, cavitation, collision force, potential core and the like, which are generated between a turbine or rotor rotating usually at a high peripheral speed of about 1 m/sec. to about 40 m/sec. and a stator for the turbine or screen for the rotor of a special mixer generically known as a homomixer or homogenizer, which comprises a specially designed turbine or rotor rotating at a high speed and a stator or screen provided around the turbine or rotor with a clearance of usually 2 mm or less. The high shear rate stirring area (in this specification, it is referred to as "said stirring area") means the area in which the high shear rate stirring state is generated.

Examples of such mixer for high shear rate stirring (in this specification, it is referred to as "the high shear rate mixer") are T.K. Homomixer (manufactured by Tokushu Kika Kogyo Kabushikikaisha), Cleamix (manufactured by M Technique Kabushikikaisha) Polytron homogenizer and Megatron homogenizer (both manufactured by KINE-MATICA), Supraton (manufactured by Tsukishima Kikai Kabushikikaisha) and the like.

The conditions for high shear rate stirring can be expressed by a shear rate represented by the formula:

$$x/y \times 10^3 \text{ sec.}^{-1}$$

wherein x is a peripheral speed (m/sec.) of the turbine (rotor) which rotates at a high speed and y is a clearance (mm) between the turbine (rotor) and the stator (screen).

In the process of the present invention, the high shear rate stirring condition should generate a shear rate of usually at least 3000 sec.$^{-1}$, preferably at least 5000 sec.$^{-1}$ and more preferably at least 8000 sec.$^{-1}$. When the shear rate is less than 3000 sec.$^{-1}$, mixing of said mixture solution and water and mechanical dispersion of said hydroxide particles produced are insufficient, so that the coarse particles tend to be formed.

In the hydrolysis reaction of said mixture by water and subsequent precipitation of said hydroxide, aluminum hydroxide gel is instantaneously precipitated because the higher reaction rate of aluminum alkoxide. Therefore, low or moderate rate rotating type stirrers represented by the usual paddle type or screw type, as well as motionless mixer such as a static mixer, are not appropriately used in the present invention due to the fact that generation of coarse particles of some tens μm cannot be avoided.

In the process of the present invention, a residence time, the period from the time of supplying of said mixture and water to said stirring area, to the time of discharge of said hydroxide from said stirring area, is usually from about 5 seconds to about 15 minutes, preferably from about 30 seconds to about 8 minutes. When the residence time in the stirring area is too short, the reaction is not completed in the stirring area so that the particles discharged from the stirring area are polymerized or agglomerated, whereby the particles are reagglomerated or insufficiently dispersed. When the residence time in the stirring area is too long, productivity may be decreased.

As the continuous reactor for the purpose of the present invention, any type of continuous reactor such as a tank continuous-type reactor or a pipeline continuous-type reactor may be used.

The reaction in the tank continuous-type reactor is carried out by continuously supplying said mixture and water to a tank equipped with the high shear rate mixer and continuously discharging the reaction mixture in the same amount as that of the supplied liquid to produce said hydroxide particles.

The reaction in the pipeline continuous-type reactor is carried out by supplying said mixture and water to the high shear rate mixer installed in a pipeline.

Since the continuous reaction can achieve a higher productivity and make the particle precipitation conditions more uniform than a batchwise reaction, said hydroxide having the uniform particle size distribution and containing no coarse particles can be produced.

For the purpose of the present invention, it is preferred to conduct the reaction at a constant molar ratio of said mixture and water to be supplied in order to unify the degree of completion of the hydrolysis and the properties such as crystal form and the like of said hydroxide. The molar ratio (water/Al) is preferably about 1.5 to about 6.0.

In addition, water may be supplied in any desired form, for example, as it is or as a solution with the alcohol, as long as the molar ratio (water/Al) is in the range described above.

The reaction temperature is not limited. Usually, the reaction is carried out in a temperature range from room temperature to the boiling temperature of the solvent.

The reaction pressure is preferably 0.1 kgG/cm² or higher. When the reaction pressure is lower than 0.1 kgG/cm², bubbles tend to be trapped in said stirring area, which may increase the mechanical energy loss.

To improve the dispersion of precipitated particles to a and prevent form agglomeration of the particles in said hydroxide slurry, a surface charge regulator such as an acid or a base, or a surfactant such as a dispersant or an emulsifier may be added in the hydrolysis reaction.

Examples of the acid are hydrochloric acid, nitric acid, acetic acid, and the like, and examples of the base are ammonia, triethylamine, and the like. Examples of the surfactant are nonionic surfactants such as sorbitan monooleate, sorbitan trioleate, sorbitan monolaurate, triolein, polyoxyethylene phenyl ether, and so on; anionic surfactants such as sodium alkyldiphenyldisulfonate, sodium salt of dialkylsulfosuccinate, and so on; cationic surfactants such as N-alkyltrimethylenediamine oleate, and so on.

Said hydroxide slurry prepared by the process of the present invention can be separated into solid and liquid by the treatment such as evaporation, drying and filtration.

As the solid-liquid separation, the method using a pneumatic conveying dryer (in this specification it is referred to as "said pneumatic conveying drying method") and the method comprising heating said hydroxide slurry to or above the boiling temperature of the liquid at atmospheric pressure and spraying said heated hydroxide slurry with pressure from a nozzle using flash dryer (in this specification, it is referred to as "said flash drying method") are preferred as a particularly suitable embodiment, since said hydroxide can be effectively isolated without agglomeration.

Dryers are generally classified into 8 kinds, as shown below, based on their mechanism:
1. material standing-type dryer,
2. material transferring-type dryer,
3. material stirring-type dryer,
4. hot-air transferring-type dryer,
5. cylindrical dryer,
6. infrared rays dryer,
7. freeze dryer, and
8. high-frequency dryer, (reference: "Kagaku Kogaku Binran" Fifth Edition, p.683, Published by Maruzen).

The pneumatic conveying dryer is included in the hot-air transferring-type dryer and the flash dryer does not fall under the conventional classification and utilizes flash evaporation.

The pneumatic conveying dryer acts by instantly dispersing and drying wet powders such as slurry in an air flow at high temperature and high speed.

The dryer may be manufactured and set in a plant in which the dryer is used or alternatively is commercially available from Kurimoto Ltd., or Kabushiki Kaisha Seishin Kigyo (Tradename: Flash Jet Dryer).

Conditions of said pneumatic conveying drying method are not particularly limited and said fine-particulate hydroxide with good powder dispersion is obtained by, for example, adjusting pressure, air flow, temperatures at inlet and outlet of the dryer and amount of feeding slurry.

The flash dryer produces solid particles upon evaporation of the liquid from the slurry by spraying, with pressure, the slurry heated to or above the boiling temperature of the liquid at the atmospheric pressure from a nozzle.

Conditions of said flash drying method are not particularly limited and said fine-particulate hydroxide with good powder dispersion is obtained by, for example, adjusting drying temperature, drying period, residence period, spraying pressure and so on.

The temperature for drying is not particularly limited and it may be within a range from the boiling point of the liquid up to just below the lowest decomposition point of one of the components in the liquid.

In the case where said pneumatic conveying drying method or said flash drying method is applied, said hydroxide slurry is sprayed out with pressure or the particles are dried in jet flow at high temperature and high pressure. Consequently, the liquid between particles is evaporated instantaneously, and said fine-particulate hydroxide can be obtained because the particles can pass through the granulation zone very shortly.

Said hydroxides obtained in the above manner are fine particles having average particle size of about 5 μm below and usually about 3 μm or below, and are substantially free of coarse particles of 10 μm or above. They can be used in the same way as the fine-particulate aluminum hydroxide as fillers for various resins, papers and textiles.

By calcining said hydroxide at about 500° C. to abut 1500° C., fine-particulate metal oxide comprising γ, δ, Θ and/or α-aluminum oxide as a major component (in this specification, it is referred to as "said fine-particulate oxide") is obtained which is suitably used like fine-particulate γ, δ, Θ and/or α-alumina as a filler for various resins such as PET films or epoxy resins, a coating filler for paper and textile for ink jet printing, a carrier for catalyst, a raw material for single crystal, an abrasive or a raw material for sintering.

Said fine-particulate oxide usually contains 0.1 to 15% by mole, preferably 1 to 10% by mole in total of other metal component(s) of metal oxide(s) derived from at least one said other metal alkoxide as compared to the aluminum component [(total molar weight of Mg, Ca, La, Fe, Si, Ti and Zr)/(molar weight of Al)].

The period for calcination depends on the method of calcination and, in practical production, is selected on the basis of experiment such that a desired crystal form is obtained. Usually, the period is within a range from several seconds to 100 hours.

The method for calcination is not particularly limited and my be a conventional process using a rotary kiln, flash calcining furnace, packing-type calcining furnace, fluidized calcining furnace, tunnel furnace, vacuum furnace, shuttle furnace and the like. Usually, a method using a rotary kiln, tunnel furnace, shuttle furnace and the like is suitable from the view point of productivity and heat resistance of material.

In the case where said hydroxide, obtained by hydrolyzing said mixture comprising Ti alkoxide and aluminum alkoxide and then drying the product, is calcined, the calcination is promoted as compared with the case of aluminum alkoxide alone. In other words, when said fine-particulate oxide having certain specific surface is intended, said fine-particulate oxide containing Ti is suitable from the industrial point of view because it can be prepared by calcination at a lower temperature than that of aluminum oxide alone.

Said fine-particulate oxide comprising aluminum oxide as a major component obtained above has an average particle size of about 5 μm less and usually about 3 μm less, and is substantially free from coarse particles of 10 μm or more.

As described in detail, according to the present invention, fine-particulate metal hydroxide comprising aluminum hydroxide as a major component and free from coarse or agglomerated particles may be obtained effectively and with good industrial productivity by continuous hydrolysis of a mixture comprising an alkoxide of specific metal and aluminum alkoxide with water under specific stirring conditions, and further, by combining specific drying process, said hydroxide may be obtained more effectively. In addition, by calcining said hydroxide, fine-particulate metal oxide comprising aluminum oxide as a major component and free from coarse or agglomerated particles may be obtained.

The present invention will be illustrated in more detail by the following Examples. However, the present invention should not be construed to be limited by such Examples.

In the following Examples, the crystal form and particle sizes D50 (particle size at 50% cummulation) and D90 (particle size at 90% cummulation) were measured as follows:

Crystal form: The crystal form was measured using a powder X-ray diffraction apparatus (Geiger Flex RAD Series manufactured by Rigaku Denki Kogyo Kabushikikaisha):

Particle size: The particle size is measured by the MICROTRACK MK II particle size analyzer (SPA Model 7997-20 manufactured by Nikkiso Kabushikikaisha).

The BET specific surface and pore volume were measured as follows:

Apparatus: Gas absorption/desorption analyzer "Omunisorb 360" (manufactured by COULTER LTD.,)

Method of analysis: A sample was degassed as its original shape, overnight at 130° C., less than $2\times10^{-5}$ torr, and assayed for absorption and desorption by continuous volume method using nitrogen gas.

EXAMPLE 1

In a 1600 cc pressure vessel which was resistant to 10.5 kg/cm$^2$ (working pressure: 0.5 kg/cm$^2$), there was equipped a high shear rate mixer Cleamix CLM-L 3.7S (manufactured by M Technique Kabushikikaisha), having a rotor of 57 mm in maximum diameter and 25 mm in minimum diameter leaving a clearance of 0.3 mm. At a rate gradient of 43,700 to 100,000 sec.$^{-1}$, a mixture of 75% by weight of aluminum isopropoxide and isopropanol and a mixture of titanium tetraisopropoxide and isopropanol were mixed. The mixture of titanium tetraisopropoxide, aluminum isopropoxide and isopropanol wherein molar content of titanium as compared to aluminum is 3%, the concentration of aluminum isopropoxide is 60% by weight, and aqueous isopropanol, wherein the concentration of water is 30% by weight, were continuously and separately supplied in the mixer for a residence time of 8 minutes at a constant molar ratio of water/aluminum isopropoxide at 2.7, and hydrolyzed at a temperature of 40° to 70° C. to obtain metal hydroxide comprising aluminum hydroxide as a major component, which was amorphous and had D50 of 1.3 μm and D90 of 2.7 μm.

Comparative Example 1

In a 2 liter separable flask, there was equipped a stirrer having stirring blades of maximum diameter of 145 mm and the minimum diameter of 10 mm, which were designed so that a clearance between the inner flask wall and the blade tips was about 5 mm. Then, a mixture of 75% by weight of aluminum isopropoxide and isopropanol and a mixture of water and isopropanol containing 30% by weight of water were continuously and separately supplied in the flask, at a molar ratio of water/aluminum isopropoxide of 2.0, and hydrolyzed at a temperature of 40° to 70° C. for 60 minutes while rotating the stirring blades at 100 rpm, corresponding to the shear rate of from about 10 sec.$^{-1}$ to about 150 sec.$^{-1}$ to obtain aluminum hydroxide, which was amorphous and had particle sizes D50 of 9.9 μm and D90 of 21.6 μm.

EXAMPLE 2

Preparation was performed in the same manner as in Example 1, except that the molar content of titanium as compared to aluminum was changed to 6%, and said mixture was hydrolyzed to obtain said fine-particulate hydroxide, which was amorphous and had particle Sizes D50 of 1.5 μm and D90 of 3.1 μm.

EXAMPLE 3

Preparation was performed in the same manner as in Example 1, except that titanium tetraisopropoxide was replaced by ethyl silicate and the molar content of silicon as compared to aluminum was changed to 2%, and said mixture was hydrolyzed to obtain said fine-particulate hydroxide, which was amorphous and had particle sizes D50 of 1.2 μm and D90 of 2.7 μm.

EXAMPLE 4

Preparation was performed in the same manner as in Example 1, except that titanium tetraisopropoxide was replaced by ethyl silicate and the molar content of silicon as compared to aluminum was changed to 1%, and said mixture was hydrolyzed to obtain said fine-particulate hydroxide, which was amorphous and had particle sizes D50 of 1.6 μm and D90 of 5.1 μm.

EXAMPLE 5

The obtained slurry in Example 1 is dried in a pneumatic conveying dryer (Tradename: Flash Jet Dryer FJD-4, manufactured by K.K. Seishin Kigyo) at a drying temperature (inlet temperature of about 270° C. and outlet temperature of about 130° C.) for a residence time of about 0.7 second under a pressure of about 0.3 kg/cm$^2$G with a air flow of 14 m$^3$/minute and a supplying rate of slurry of 114 kg/hour to obtain said dryed fine-particulate hydroxide, which has no coarse particle.

Said dryed fine-particulate hydroxide is calcined at 950° C. for 3 hours to obtain fine-particulate metal oxide, which has no coarse particle.

The invention being thus described, it will be obvious that the same my be varied in many ways. Such variations are no to be regarded as a departure from the spirit and scope of the invention, and all such modifications as would be obvious to one skilled in the art are intended to be included within the scope of the following claims.

What is claimed is:

1. A process for preparing a fine-particulate metal hydroxide comprising aluminum hydroxide as a major component which comprises continuously supplying water and a mixture comprising an aluminum alkoxide and at least one alkoxide of a metal selected from the group consisting of Mg, Ca, La, Fe, Si, Ti and Zr, to a high shear rate stirring area to form a metal hydroxide slurry.

2. The process according to claim 1, wherein the molar content of the alkoxide of the metal as compared to aluminum alkoxide is 0.1 to 15%.

3. The process according to claim 1, wherein the molar content of the alkoxide of the metal to aluminum alkoxide is 1 to10%.

4. The process according to claim 1, wherein the high shear rate stirring area is a stirring area wherein a shear rate of at least 3000 sec$^{-1}$ is generated.

5. The process according to claim 1, wherein the high shear rate stirring area is a stirring area wherein a shear rate of at least 5000 sec$^{-1}$ is generated.

6. The process according to claim 1, wherein the high shear rate stirring area is a stirring area wherein a shear rate of at least 8000 sec$^{-1}$ is generated.

7. The process according to claim 1, wherein the molar ratio of water to aluminum alkoxide is 1.5 to 6.

8. The process according to claim 7, wherein the molar ratio is constant during the process.

9. The process according to claim 1, wherein the high shear rate stirring area is a stirring area generated using a stirring apparatus having a screen set around a rotor or a stator set around a turbine.

10. The process according to claim 1, wherein a period from the time of supplying said mixture and water to high shear rate stirring area to the time of discharging said metal hydroxide is from 5 seconds to 15 minutes.

11. The process according to claim 1, wherein a period from the time of supplying said mixture and water to high shear rate stirring area to the time of discharging said metal hydroxide is from 30 seconds to 8 minutes.

12. The process according to claim 1, wherein the alkoxide of the metal is a derivative in which a part of the alkoxy groups of the alkoxide of the metal is replaced by at least one chemical modifier selected from the group consisting of diketone, ketoester, diester, carboxylic acid, diol, ketoalcohol, aldehyde, amino acid, polyhydric alcohol acetate, amine and polyether.

13. The process according to claim 12, wherein the metal in the alkoxide of the metal is Ti or Si.

14. The process according to claim 1, wherein the metal in the alkoxide of the metal is Ti or Si.

15. The process according to claim 1, wherein the process further comprises drying the metal hydroxide by a method using a pneumatic conveying dryer or a method comprising heating said metal hydroxide slurry to or above the boiling temperature of liquid in the slurry at atmospheric pressure and spraying said heated metal hydroxide slurry with pressure from a nozzle.

16. A process for preparing a fine-particulate metal oxide comprising aluminum oxide as a major component, which comprises (1) a step of preparing fine-particulate metal hydroxide comprising aluminum hydroxide as a major component by continuously supplying water and a mixture comprising aluminum alkoxide and at least one alkoxide of a metal selected from the group consisting of Mg, Ca, La, Fe, Si, Ti and Zr, to a high shear rate stirring area to form a metal hydroxide slurry, (2) a step of drying the metal hydroxide and (3) a step of calcining the dried metal hydroxide at 500° to 1500° C.

* * * * *